(12) United States Patent
Morén

(10) Patent No.: US 11,313,334 B2
(45) Date of Patent: Apr. 26, 2022

(54) ARRANGEMENT FOR TRANSFERRING FORCE FROM A CAMSHAFT TO AN OUTPUT DEVICE

(71) Applicant: Volvo Car Corporation, Gothenburg (SE)

(72) Inventor: Mats Morén, Torslanda (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 17/068,032

(22) Filed: Oct. 12, 2020

(65) Prior Publication Data

US 2021/0115886 A1     Apr. 22, 2021

(30) Foreign Application Priority Data

Oct. 16, 2019    (EP) .................................... 19203611

(51) Int. Cl.
| | |
|---|---|
| *F02M 39/02* | (2006.01) |
| *F01L 1/053* | (2006.01) |
| *F01L 1/08* | (2006.01) |

(52) U.S. Cl.
CPC ............ *F02M 39/02* (2013.01); *F01L 1/053* (2013.01); *F01L 1/08* (2013.01); *F01L 2001/0537* (2013.01)

(58) Field of Classification Search
CPC ....... F02M 39/02; F02M 59/102; F01L 1/053; F01L 1/08; F01L 2001/0537; F01L 1/047; F16H 25/14

See application file for complete search history.

(56) References Cited

U.S. PATENT DOCUMENTS

| 1,873,015 | A | | 8/1932 | Omo | |
|---|---|---|---|---|---|
| 3,650,257 | A | * | 3/1972 | Soltau | ................ F02M 69/125<br>123/369 |
| 4,488,452 | A | | 12/1984 | Jensen | |

(Continued)

FOREIGN PATENT DOCUMENTS

| CN | 106402296 A | 2/2017 |
|---|---|---|
| CN | 106574521 A | 4/2017 |

(Continued)

OTHER PUBLICATIONS

Apr. 14, 2020 European Search Report issued on International Application No. 19203611.9.

(Continued)

*Primary Examiner* — Hung Q Nguyen

(74) *Attorney, Agent, or Firm* — Clements Bernard Walker; Christopher L. Bernard

(57) ABSTRACT

A force transfer arrangement for transferring a force from a rotating camshaft to an output device, that is able to reduce the transversal force on the camshaft. The proposed connection device force transfer arrangement is configured to cause forces to act on the camshaft from substantially opposite directions which effectively produces a resultant force on the camshaft to be close to zero, or at least be reduced compared to prior art force transfer solutions. Thus, the transverse forces on the camshaft and therefore on e.g. bearings supporting the camshaft are reduced thereby the lifetime of the bearings is prolonged.

11 Claims, 5 Drawing Sheets

(56) References Cited

U.S. PATENT DOCUMENTS

| | | | |
|---|---|---|---|
| 4,535,641 A * | 8/1985 | Kriz | F02M 59/102 |
| | | | 123/90.25 |
| 5,605,096 A | 2/1997 | Kato | |
| 6,071,098 A | 6/2000 | Richards | |
| 7,650,870 B2 | 1/2010 | Fisher | |
| 10,294,907 B2 | 5/2019 | Hashida et al. | |
| 2004/0103865 A1 | 6/2004 | Duesmann | |
| 2006/0193736 A1 | 8/2006 | Boehland et al. | |

FOREIGN PATENT DOCUMENTS

| | | | | |
|---|---|---|---|---|
| CN | 108252800 A | | 7/2018 | |
| CN | 109209541 A | | 1/2019 | |
| DE | 10307877 A1 | | 9/2004 | |
| DE | 102007033889 A1 | | 1/2009 | |
| EP | 0849438 A1 | | 6/1998 | |
| GB | 1320397 A | | 6/1973 | |
| GB | 2297125 A | | 7/1996 | |
| JP | 58174152 A | * | 10/1983 | ........... F02M 59/102 |

OTHER PUBLICATIONS

Office action and search report issued in the corresponding CN application No. 202011082954.3.

\* cited by examiner

ARRANGEMENT FOR TRANSFERRING FORCE FROM A CAMSHAFT TO AN OUTPUT DEVICE

CROSS-REFERENCE TO RELATED APPLICATION

The present disclosure claims the benefit of priority of co-pending European Patent Application No. 19203611.9, filed on Oct. 16, 2019, and entitled "AN ARRANGEMENT FOR TRANSFERRING FORCE FROM A CAMSHAFT TO AN OUTPUT DEVICE," the contents of which are incorporated in full by reference herein.

TECHNICAL FIELD

The present disclosure relates to force transfer arrangement for transferring a force from a rotating camshaft to an output device.

BACKGROUND

Internal combustion engines rely on critical timing of air/fuel injection and exhaust of gases with the stroke of pistons. The control of valves and fuel pumps is often achieved by camshafts that rotate in a synchronized manner with a crankshaft via a belt or chain. The crankshaft rotation is caused by the piston motions.

A camshaft comprises of a shaft and at least one, often several, cams arranged on the shaft. As the shaft rotates, the cam moves around the rotation axis of the shaft and causes a force on a control element to for example open or close a valve depending on the rotational position of the camshaft or cause a fuel pump to inject fuel.

A camshaft is supported by a bearing in order to allow for it to rotate with little resistance. Generally, such bearings should preferably not be exposed to radial forces, transversal to the camshaft main axis in order to ensure satisfactory lifetime for the bearings.

SUMMARY

The present disclosure generally relates to a force transfer arrangement for transferring a force from a rotating camshaft to an output device, that can reduce the transversal force on the camshaft, to thereby improve the lifetime of the cam shaft and bearing, but also reduce vibrations caused transversal forces on the camshaft.

The proposed force transfer arrangement is configured to cause forces to act on the camshaft from substantially opposite directions which effectively produces a resultant force on the camshaft to be close to zero, or at least be reduced compared to prior art force transfer solutions. Thus, the transverse forces on the camshaft and therefore on e.g. bearings supporting the camshaft are reduced whereby the lifetime of the bearings is prolonged and issues related to noise, vibrations, and harshness can be alleviated.

The above advantages are provided by allowing two force transfer elements to be in contact with the camshaft when transferring force to the same output element in such a way that, when the force transfer elements transfers force to the output element, they are at the same time causing resulting forces that are directed substantially towards each other. In other words, the main part of the force caused on the camshaft by the first force transfer element is in opposite direction to the main part of the force caused on the camshaft by the second force transfer element.

More precisely, the inventors propose a force transfer arrangement for transferring a force from a rotating camshaft to an output device. The force transfer arrangement includes a first transfer element being in contact with the camshaft and configured to transfer force from the camshaft to the output device when the camshaft rotates. Further, a second transfer element being in contact with the camshaft and configured to transfer force from the camshaft to the output device when the camshaft rotates. The forces on the camshaft caused by the first transfer element and the second transfer element when transferring forces to the output element, are in substantially opposite directions.

Further features of, and advantages with, the embodiments of the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF DRAWINGS

These and other aspects of the present disclosure will now be described in more detail, with reference to the appended drawings showing example embodiments of the present disclosure, wherein.

DETAILED DESCRIPTION

Figure 1:
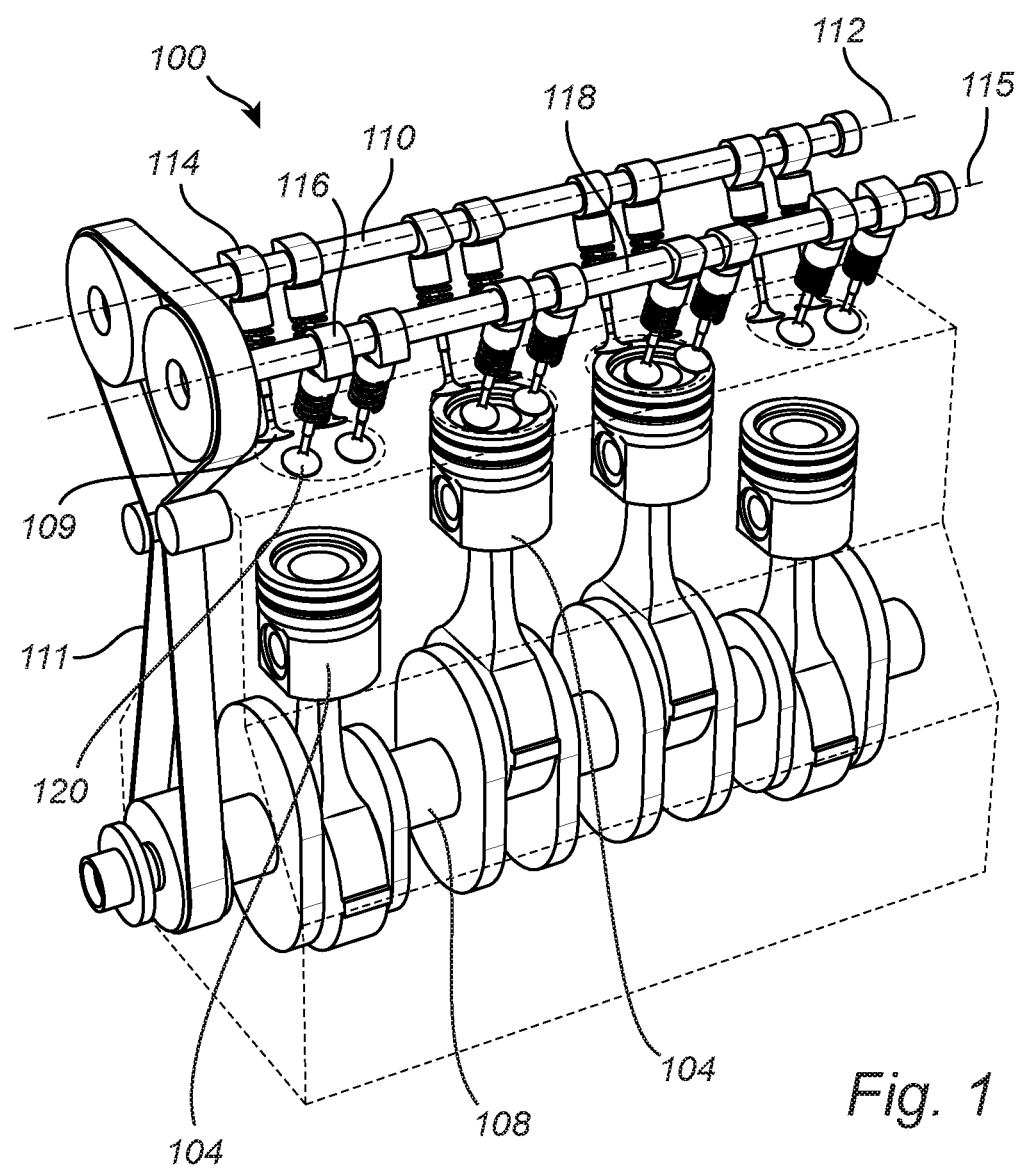
FIG. 1 illustrates an exemplary combustion engine for a vehicle.

In the present detailed description, various embodiments of a force transfer arrangement according to the present disclosure are described. However, embodiments of the present disclosure may be realized in many different forms and should not be construed as limited to the embodiments set forth herein; rather, these embodiments are provided for thoroughness and completeness, and to fully convey the scope of the invention to the skilled person. Like reference characters refer to like elements throughout.

FIG. 1 conceptually illustrates an exemplary combustion engine 100 for a vehicle. The combustion engine includes multiple cylinders (not shown) and multiple pistons 104. In each of the cylinders is a respective piston 104 arranged. The pistons 104 are forced to move in the respective cylinder by the ignition of fuel in the cylinder volume. The stroke motion of the piston in the cylinder is transferred to a crankshaft 108 for transferring propulsion power to the driveline (not shown) of the vehicle including the combustion engine 100.

Further, in order to allow air to mix with the fuel in the cylinder volume a valve 109 (only one of several valves is numbered) is configured to open an air inlet to the cylinder volume at timed intervals. The timing is provided by a linking mechanism 111 (a so-called "timing belt") which is configured to rotate a first camshaft 110 about a rotation axis 112 such that a cam 114 of the camshaft 110 causes the first valve 109 to open and close in a synchronized manner with respect to the rotation of the crankshaft and thereby with respect to the strokes of the piston 104.

Furthermore, a second camshaft 118 is configured to open and close a second valve 120 (only one is numbered). The timing of the operation of the second valve 120 is also is provided by the linking mechanism 111. Thus, the linking mechanism is configured to rotate the second camshaft 118 about a rotation axis 115 such that a cam 116 of the second camshaft 118 causes the second valve 120 to open and close in a synchronized manner with respect to the rotation of the crankshaft 108 and thereby with respect to the strokes of the piston 104.

The second valve 120 may control the outflow of exhaust from the cylinder volume in a synchronized manner with the rotation of the crankshaft 108 and thereby with respect to the strokes of the piston 104.

The configuration of the engine 100 shown in FIG. 1 is purely exemplary and should not be construed as limiting the scope of the appended claims. For example, the camshaft may be arranged to additionally control fuel pumps or oil pumps, or other example output devices.

Figure 2:
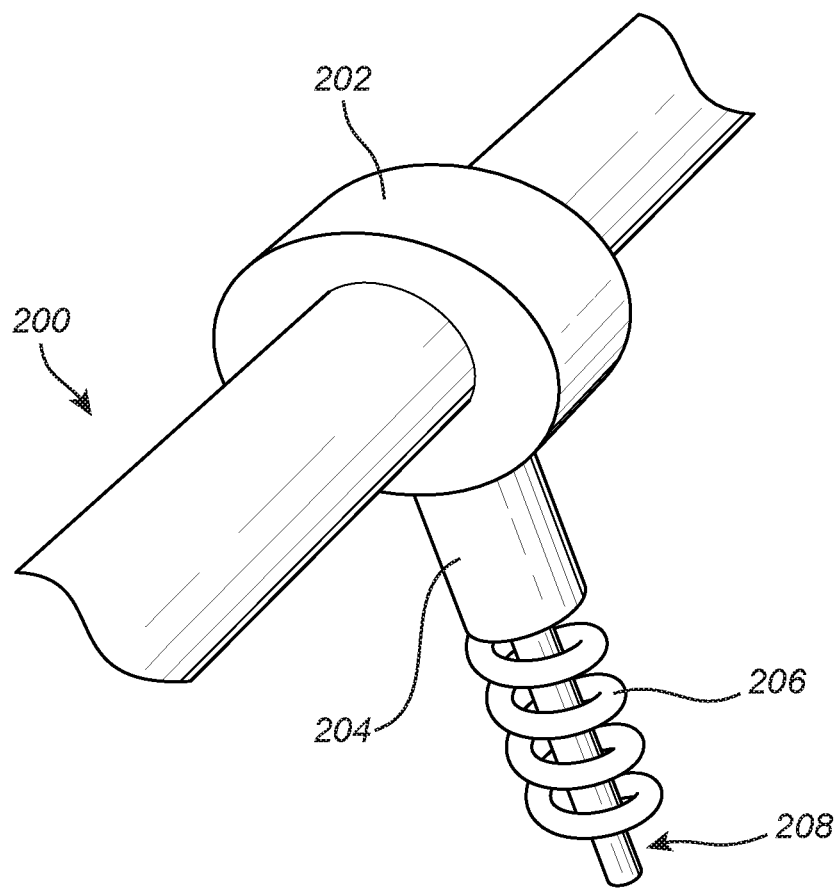
FIG. 2 conceptually illustrates a camshaft including a cam applying force on to an output device.

FIG. 2 conceptually illustrates a partial camshaft 200 with a conceptual cam 202. The cam 202 is in contact with a push element 204 adapted to be pushed towards the spring 206 as the camshaft 200 rotates and the wider portion of the cam 202 aligns with the push element 204. When the narrower portion of the cam 206 aligns with the push element 204, the spring 206 expands and pushes the push element 204 in the direction towards the camshaft 200 such that the push element 204 maintains contact with the cam 202. The push element 204 is arranged to control an output device 208 adapted to control e.g. a fuel pump or an oil pump. For example, when the push element 204 is pushed away from the camshaft 200 and thereby compresses the spring 206, the fuel pump may be caused to inject fuel into the engine of the vehicle.

Figure 3:
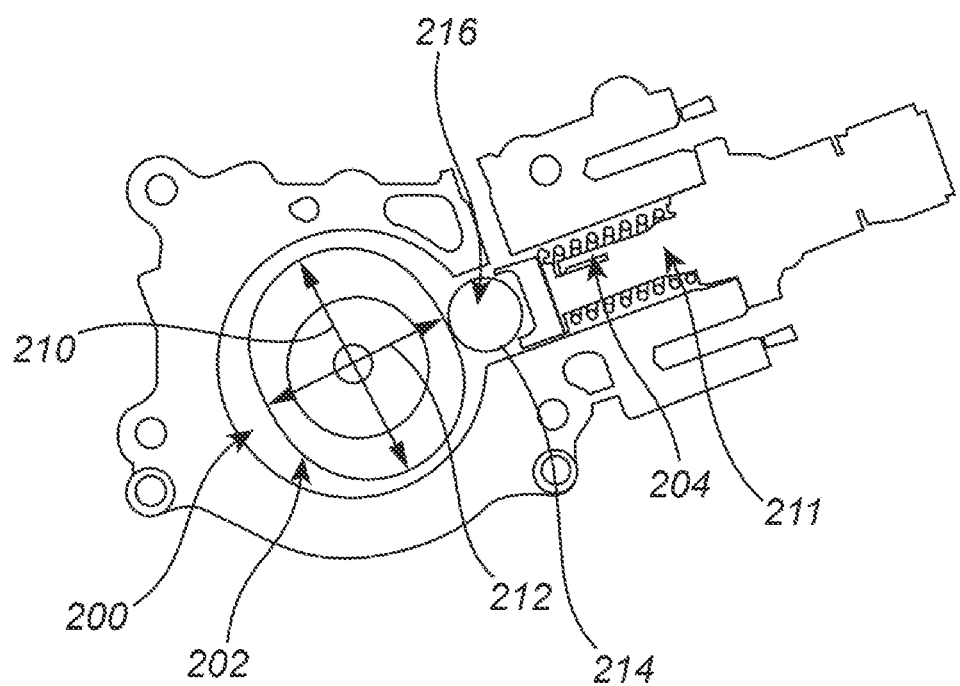
FIG. 3 illustrates an example prior art arrangement.

FIG. 3 illustrates an example prior art arrangement. Here, the camshaft 200 includes the cam 202 which has a wide dimension 210 and a narrow dimension 212. A coupling element 214 is here arranged to control a conceptually illustrated fuel pump 211. A spring 204 ensures that the coupling element 214 is in contact with the camshaft 202. Thus, when the camshaft rotates and moves the coupling element 214 by means of the cam profile, the coupling element 214 causes the spring 204 to compress at the same time as the fuel pump 211 is controlled by the motion. When the camshaft 200 causes the output device 214 to compress the spring 204, a counter force 216 acts on the camshaft and therefore also on bearings supporting the camshaft 200. This force 216 acts transversal to the axis of the camshaft and causes tear on the bearings and the support structures for the camshaft 200. The embodiments of the present disclosure alleviate this problem.

Figure 4A:
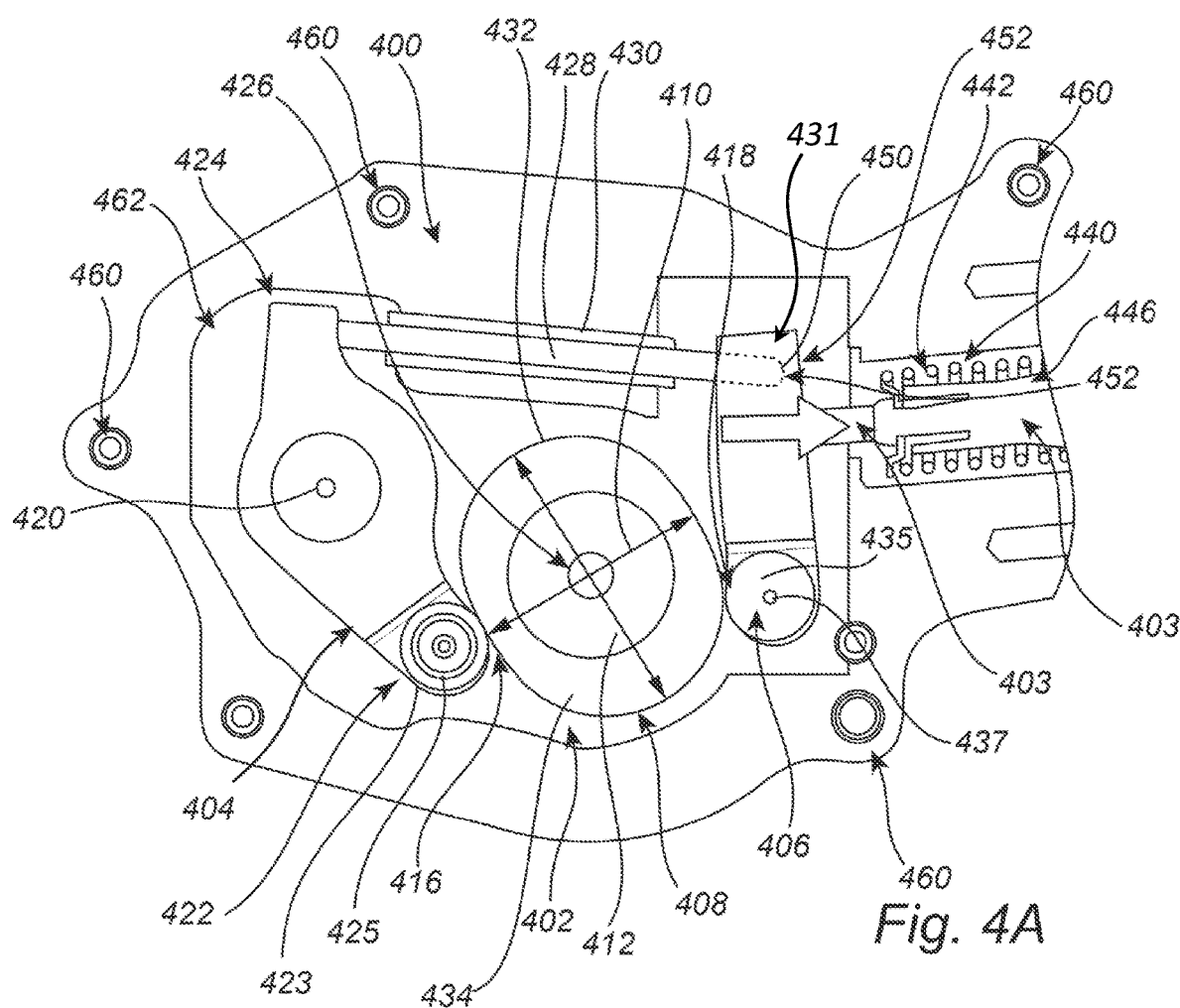
FIG. 4A conceptually illustrates an embodiment of a force transfer arrangement according to embodiments of the present disclosure.

FIG. 4A conceptually illustrates an embodiment of a force transfer arrangement according to embodiments of the present disclosure. Accordingly, FIG. 4A conceptually illustrates a force transfer arrangement 400 for transferring a force from a rotating camshaft 402 to an output device 403. The force transfer arrangement 400 includes a first transfer element 404 being in contact with the camshaft 402 and configured to transfer force from the camshaft 402 to the output device 403 when the camshaft rotates. A second transfer element 406 is in contact with the camshaft 402 and is configured to transfer force from the camshaft 402 to the output device 403 when the camshaft 402 rotates. The forces on the camshaft 402 caused by the first transfer element 404 and the second transfer element 406 when transferring forces to the output element, are in substantially opposite directions.

FIG. 4A illustrates the camshaft 402 in a rotational orientation where the cam 408 has its narrow dimension 410 substantially aligned with the force transfer elements 404 and 406 such that they cause little or no translational action on the output device 403, in other words, the output device is in a first position which may be a withdrawn position.

Figure 4B:
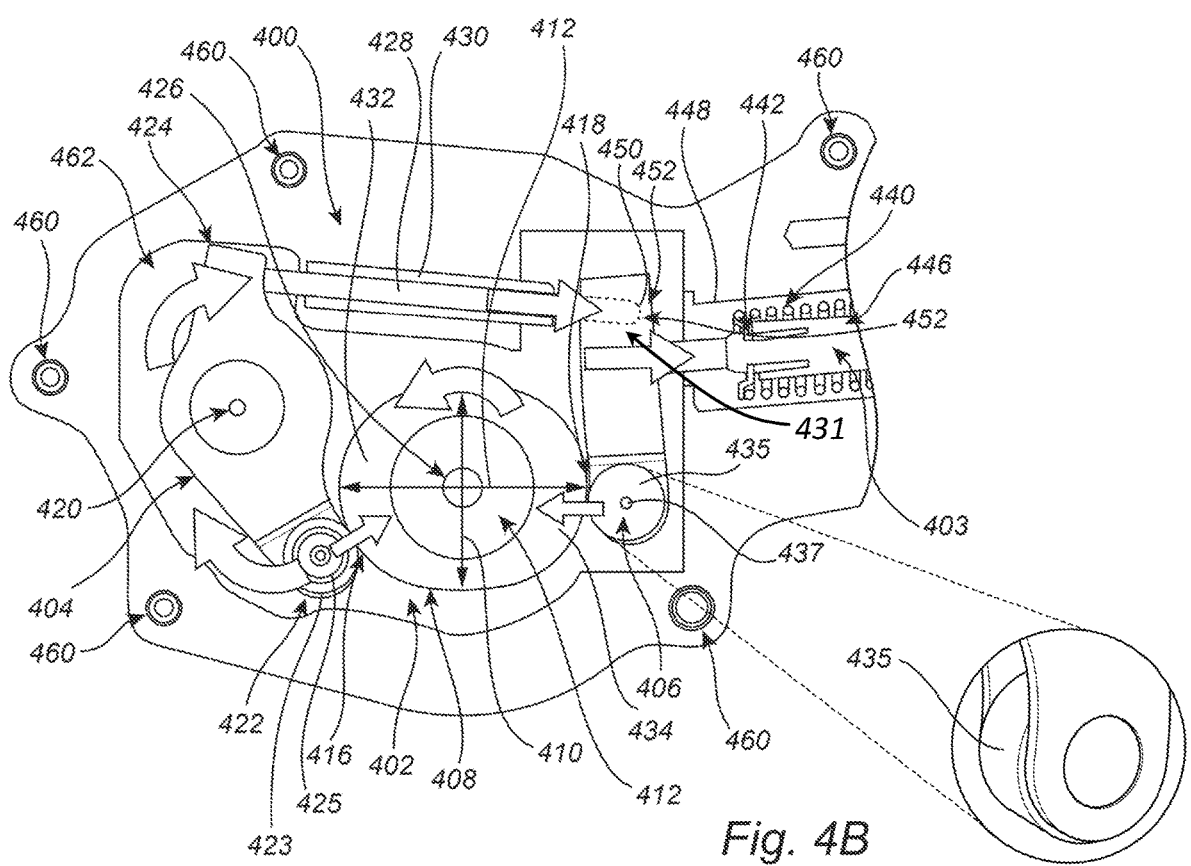
FIG. 4B conceptually illustrates an embodiment of a force transfer arrangement according to embodiments of the present disclosure.

FIG. 4B illustrates the force transfer arrangement 400 when the camshaft 402 has rotated such that the wide portion 412 of the cam 408 causes the force transfer element 404 to be pushed away in a first direction from a rotation axis of the camshaft 402 to transfer force to the output device 403. Further, with the camshaft 402 in this orientation, the second force transfer element 406 is arranged to be pushed away in a second direction from the rotation axis of the camshaft when transferring force to the output device 403. The first direction is substantially opposite to the second direction. Preferably, the first transfer element 404 may be arranged to be pushed away in the first direction by the camshaft 402 at the same time as that the second transfer element is pushed away in the second direction.

The force 416 caused by the first transfer element 404 on the camshaft 402 that is opposite to the force 418 caused by the second force transfer element 404 are of substantially equal magnitude, and preferably the main parts of the forces are in opposite directions. Consequently, the resultant force on the camshaft is substantially zero.

Accordingly, the inventors realized that by arranging two force transfer elements to act simultaneously on the camshaft to transfer force to the same output device, in such a way that they at least partly act in opposite directions on the camshaft, the resultant force on the camshaft may be at least reduced. Thereby, the wear on the camshaft and the bearings supporting the camshaft may be reduced and their lifetime prolonged. Further, potential NVH (Noise, Vibration, Harshness) issues related to lash in the camshaft bearing is reduced to a minimum by means of embodiment of the present disclosure.

That the forces acting on the camshaft are in substantially opposite directions should be broadly interpreted to include that at least a component of the forces act in opposite directions. Preferably, the main parts/components of the forces act in opposite directions such that the resultant force is kept as small as possible. However, a deviation from opposite is allowed, as is exemplified in FIG. 4B. The same interpretation applies to the that the force transfer elements may be arranged to be pushed away in substantially opposite directions, i.e. a deviation from opposite directions is allowed as long as the resultant force on the camshaft is kept small.

The general inventive concept of the present disclosure may be implemented in various way, with the aim to reduce the transversal force on the camshaft by configuring first transfer element and the second transfer element such that when transferring forces to the output element, the forces on the camshaft are in substantially opposite directions. One such possible implementation will now be described in more detail with reference to FIGS. 4A-B.

Turning to FIGS. 4A-B, the first transfer element 404 may be rotationally attached adjacent to the camshaft and is rotatable about a rotation axis 420, wherein the first transfer element includes a contact portion 422 being in contact with the camshaft 402, and a transfer portion 424, wherein when the contact portion 422 is pushed away from a rotation axis 426 of the camshaft 402, the transfer portion 424 is arranged to move in a substantially opposite direction to thereby transfer force to the output device 403. In other words, the first force transfer element 404 is rotated about its rotation axis 420 by the force applied to it by the camshaft 402. The rotation causes the transfer portion to travel along the circumference of the rotational motion, and to thereby transfer force towards the output device 403. Thereby, one possible way to enable a force to be transferred from one side of the camshaft 402 main axis to the other side, where the output device 403 is located, is provided.

The first transfer element 404 includes the contact portion 422 arranged to receive the force from the cam 408 of the camshaft. Further, the first force transfer element has an extension, the transfer portion 424, that reaches past the camshaft width so that it may transfer force to the other side of the camshaft 402 main axis. In FIGS. 4A-B, the transfer portion 424 reaches above the camshaft 402. For this, the length of the first transfer element 404, from the contact portion 422 to the transfer portion 424 exceeds the width of the camshaft preferably that width of the wide portion 412 of the cam 408.

The contact portion 422 may be configured as a here conceptually illustrated rolling element 423 that is supported by a conceptually illustrated bearing 425 such that the rolling element rotates as it moves along the periphery of the cam 408.

The transfer portion 424 may be arranged to push on a linkage arm 428 when the first transfer element 404 rotates, to thereby transfer force from one side of the camshaft to the output device 403. The linkage arm may be arranged in a guiding passage 430 of the engine. The coupling between the linkage arm 428 and transfer element 424 does not require the linkage arm 428 and the transfer element 424 be mechanically attached to each other. The linkage arm may have a substantially planar surface that is in contact with the transfer element 424 by the forces present in the arrangement 400. For example, the forces transferred from the camshaft 402 and counter-forces from the output device 403 may ensure that the linkage arm 428 and the transfer element 424 maintain contact. At the contact interface between the linkage arm 428 and the transfer element 424, the transfer element 424 may include a convex portion to account for the rotational motion of the transfer element 424 and reduce wear in the contact interface.

It may also be possible to have the linkage arm 428 be pivotally attached to the transfer element 424.

The second force transfer element 406 may be arranged to be linearly displaced when the camshaft 402 rotates, to transfer force to the output element 403. Thus, as the second force transfer element 406 alternatively contacts the narrow part and the wide part of the cam 408, the second force transfer element 406 is displaced linearly in a direction away from or towards the camshaft axis 426. The second force transfer element 406 may be arranged to be linearly displaced towards the output device 403. In this way may an efficient transfer of force to the output device 403 be obtained.

Similar to the contact portion 422 of the first transfer element, the second transfer element 406 may include a rolling element 435 that is rotatable about a center axis 437 by means of a bearing. Thus, when the camshaft rotates the rolling element 435 rotates to thereby travel along the periphery of the cam 408.

The first transfer element 404 may be mechanically coupled to the second force transfer element 406. Here, in FIGS. 4A-B, the transfer portion 424 of the first transfer element 404 is coupled to a coupling portion 431 of the second force transfer element 404. Accordingly, when the contact portion 422 of the first transfer element 406 is pushed away from the camshaft axis 426 by the cam 408, the transfer portion 424 rotates towards the side of the camshaft where the second force transfer element 406 is located. The linkage arm 428 is consequently caused to push on the coupling portion 431. At the same time, the cam 408 causes the second transfer portion 406 to be pushed away from the camshaft axis 426 in a direction which may be substantially opposite to the direction of the motion of the first force transfer element contact portion 422, and in a direction substantially parallel with the direction of the motion of the linkage arm 428 as it is pushed by the transfer portion 424. In this way, are the forces transferred by the force transfer elements synchronized. Further, in this way, the first transfer element 404 and the second transfer element 406 are arranged such that the forces transferred by the first transfer element 404 and the second transfer element 406 to the output device 403 are added to each other.

The linkage arm 428 may be pivotally attached to the coupling portion 431, or as conceptually illustrated in FIG. 4B, the linkage arm 428 may be placed in a cavity or hole 450 of the coupling portion where it is guided and maintain in place such that it can push on the coupling portion 431. With the linkage arm 428 placed in a cavity or hole 450, the linkage arm 428 does not have to be mechanically attached to the coupling portion 431.

The second transfer element 406 including the coupling portion 431 and the rolling element 435 are held in place by the counter-force from the output device 403, here the counter-force is provided by the spring 440. Accordingly, on one side of the second transfer element 406 the spring 440 applies a force, and on the opposite side of the second transfer element 406 is the linkage arm 428 and the cam 408 arranged in contact with the second transfer element 406 to counter-act the spring force. The spring 440 thus pushes the second transfer element 406 towards the linkage arm 428 and the cam 408 such that the second transfer element 406 in held in place therebetween. The spring 440 maintains a pressure on the second transfer element 406 such that it is pushed towards and maintain contact with the cam 408 of the camshaft 402. The second transfer element 406 is thus suspended by the force applied by the spring 440 that causes the second transfer element to be pressed against the linkage arm 428 and the camshaft 402.

Further, the linkage arm 428 has a rounded front end 452 that fits in the hole 450, or in some cases trench. The hole 450 or trench is somewhat larger in diameter than the diameter of the linkage arm 428 such that the linkage arm 428 is adapted to pivot in the hole 450 as the second force transfer element 406 is in motion. The ensures a smooth motion of the second transfer element when the linkage arm 428 applies its force on the second transfer element 406 at the same time as the cam 408 applies its force on the second transfer element 406.

The second transfer element 406 is preferably coupled to the output device 403 by that the output device 403 pushes on a surface of the second transfer element 406 without the second transfer element and the output device being mechanically attached to each other.

The linkage arm 428 applies its force on the second transfer element 406 a distance away from where the cam 408 applies its force on the the rolling element 435. Accordingly, the hole 450 is spaced apart from the the rolling element 435. Furthermore, the output element 403 is arranged in contact with the second force transfer element 406 at a location between the hole 450 and the rolling element 435, but on the opposite side of the second force transfer element 406 with respect to the linkage arm 428 and the hole 450.

Preferably, and as illustrated in FIGS. 4A-B, the first transfer element 404 and the second transfer element 406 are arranged to be pushed by the same cam 408 on the camshaft 400. The cam 408 has lobes 432, 434 on opposite sides of the camshaft 402.

Preferably, the first transfer element 404 and the second transfer element 406 may be arranged to be pushed by cams having profiles that matches the positions of the respective one of the first transfer element 404 and the second transfer element 406. In other words, the relative position of the lobes 432, 434 with respect to each other, matches the relative positions of the rolling element 435 of the second force transfer element and the rolling element 423 of the first force transfer element. Thus, when one of the lobes 432, 434, is in contact with one of the rolling elements 435, 423, then the other one of the lobes 432, 434, is in contact at the widest part with width 412 with the other one of the rolling elements 435, 423.

The force transfer arrangement 400 is accommodated in a housing which is attached to the engine at the attachment holes 460. The housing defines a space 462 between the housing and the engine. The spacing between the housing and the engine is limited to prevent e.g. the second force transfer element to move sideways, i.e. in or out of the plane of the drawing in FIGS. 4A-B.

The output device 403 may be configured in various ways. Here, a spring 440 is arranged to provide a counter force to the first transfer element 404 and the second transfer element 406 such that the first transfer element and the second transfer element maintain contact with the camshaft 400. The spring provides a spring-loaded control of the e.g. fuel pump. The spring may for example be arranged in contact with a stop element 442 attached to or coupled with a shaft 446 connected to the coupling portion 431 of the second transfer element 406. The shaft 446 transfers forces from the first and second transfer element to the fuel pump and is arranged coaxially, inside the spring 440. The shaft 446 is arranged in a though-hole of the stop element 442 which may be provided in the form of a washer. The outer diameter of the washer is larger than the diameter of the spring 440 such that the spring can be pushed by the washer and is prevented from falling out of a guiding passage 448 leading to the fuel pump.

The output device 403 may be adapted to control a fuel pump or an oil pump. Embodiments of the present disclosure are advantageous for such devices since they tend to cause relatively high loads on the camshaft, as compared to for example valves which often cause less load.

There is further provided a vehicle engine including a camshaft, an output device, and the force transfer arrangement according to embodiments of the present disclosure.

Further, according to aspects of the present disclosure there is provided a vehicle including such a vehicle engine.

The person skilled in the art realizes that the present invention by no means is limited to the preferred embodiments described above. On the contrary, many modifications and variations are possible within the scope of the appended claims.

The vehicle may be of various types, such as a light-duty vehicle e.g. a car, although trucks may also be applicable.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

Various examples have been described. These and other examples are within the scope of the following claims.

The invention claimed is:

1. A force transfer arrangement for transferring a force from a rotating camshaft to an output device of a vehicle engine adapted to control a fuel pump, the force transfer arrangement comprising:
   a first transfer element being in contact with the camshaft and configured to transfer force from the camshaft to the output device when the camshaft rotates, wherein the first transfer element is rotationally attached adjacent to the camshaft and is rotatable about a rotation axis, wherein the first transfer element includes a contact portion being in contact with the camshaft, and a transfer portion, wherein when the contact portion is pushed away from a rotation axis of the camshaft, the transfer portion is arranged to move in a substantially opposite direction to thereby transfer force to the output device, wherein the first transfer portion is arranged to push on a linkage arm when the first transfer element rotates, to thereby transfer force from one side of the camshaft to the output device; and
   a second transfer element being in contact with the camshaft and configured to transfer force from the camshaft to the output device when the camshaft rotates, wherein the second transfer element is arranged to be linearly displaced when the camshaft rotates, to transfer force to the output device,
   wherein the first transfer element and the second transfer element are arranged to be pushed by lobes arranged on opposite sides of the camshaft, and
   wherein the forces on the camshaft caused by the first transfer element and the second transfer element when transferring forces to the output device, are in substantially opposite directions.

2. The force transfer arrangement according to claim 1, wherein the first transfer element is arranged to be pushed away in a first direction from a rotation axis of the camshaft when transferring force to the output device, and
   wherein the second transfer element is arranged to be pushed away in a second direction from the rotation axis of the camshaft when transferring force to the output device, wherein the first direction is substantially opposite to the second direction.

3. The force transfer arrangement according to claim 1, wherein the first transfer element is arranged to be pushed away in the first direction by the camshaft at the same time as that the second transfer element is pushed away in the second direction.

4. The force transfer arrangement according to claim 1, wherein the second force transfer element is arranged to be linearly displaced towards the output device.

5. The force transfer arrangement according to claim 1, wherein the first transfer element is mechanically coupled to the second transfer element.

6. The force transfer arrangement according to claim 5, wherein the first transfer element and the second transfer element are arranged such that the forces transferred by the first transfer element and the second transfer element to the output device are added to each other.

7. The force transfer arrangement according to claim 1, wherein the first transfer element and the second transfer element are arranged to be pushed by a same cam on the camshaft.

8. The force transfer arrangement according to claim 1, wherein the first transfer element and the second transfer element are arranged to be pushed by cams having profiles that matches the positions of the respective one of the first transfer element and the second transfer element.

9. The force transfer arrangement according to claim 1, wherein a spring is arranged to provide a counter force to the first transfer element and the second transfer element such that the first transfer element and the second transfer element maintain contact with the camshaft.

10. A vehicle engine comprising a camshaft, an output device, and the force transfer arrangement according to claim 1.

11. A vehicle comprising the force transfer arrangement according to claim 1.

* * * * *